US006961714B1

(12) United States Patent
LeVine

(10) Patent No.: US 6,961,714 B1
(45) Date of Patent: Nov. 1, 2005

(54) METHOD OF QUANTIFYING ROYALTY OWNER RIGHTS

(76) Inventor: David LeVine, 336 Edgewood Rd., Redwood City, CA (US) 94062-1806

( * ) Notice: Subject to any disclaimer, the term of this patent is extended or adjusted under 35 U.S.C. 154(b) by 573 days.

(21) Appl. No.: 09/625,017

(22) Filed: Jul. 25, 2000

(30) Foreign Application Priority Data

Feb. 13, 2000 (IL) .................................. 134514

(51) Int. Cl.⁷ .............................................. G06F 17/60
(52) U.S. Cl. ........................... 705/51; 705/52; 705/53; 705/57
(58) Field of Search .................. 705/59, 51, 52, 705/53, 57, 32

(56) References Cited

U.S. PATENT DOCUMENTS

| | | | | |
|---|---|---|---|---|
| 4,232,295 A | * | 11/1980 | McConnell | 340/825.25 |
| 4,768,087 A | | 8/1988 | Taub et al. | 358/84 |
| 5,410,598 A | * | 4/1995 | Shear | 380/4 |
| 5,444,779 A | * | 8/1995 | Daniele | 399/366 |
| 5,499,340 A | * | 3/1996 | Barritz | 714/47 |
| 5,675,510 A | * | 10/1997 | Coffey et al. | 364/514 |
| 5,727,065 A | * | 3/1998 | Dillon | 380/49 |
| 5,764,762 A | * | 6/1998 | Kazmierczak et al. | 380/4 |
| 5,825,883 A | * | 10/1998 | Archibald et al. | 380/25 |
| 5,857,020 A | * | 1/1999 | Peterson, Jr. | 380/4 |
| 5,930,765 A | | 7/1999 | Martin | 705/14 |
| 5,931,901 A | | 8/1999 | Wolfe et al. | 709/206 |
| 5,949,876 A | | 9/1999 | Ginter et al. | 380/4 |
| 5,959,945 A | | 9/1999 | Kleiman | 369/30 |
| 6,049,789 A | * | 4/2000 | Frison et al. | 705/59 |
| 6,131,085 A | * | 10/2000 | Rossides | 705/1 |
| 6,141,652 A | * | 10/2000 | Reeder | 705/53 |
| 6,141,754 A | * | 10/2000 | Choy | 713/200 |
| 6,199,076 B1 | * | 3/2001 | Logan et al. | 707/501 |
| 6,226,618 B1 | * | 5/2001 | Downs et al. | 705/1 |
| 6,230,204 B1 | * | 5/2001 | Fleming, III | 709/229 |
| 6,282,653 B1 | * | 8/2001 | Berstis et al. | 713/200 |
| 6,385,596 B1 | * | 5/2002 | Wiser et al. | 705/51 |
| 2002/0150054 A1 | * | 10/2002 | Sohraby et al. | 370/252 |

FOREIGN PATENT DOCUMENTS

| | | | |
|---|---|---|---|
| EP | 0 649 074 A1 | * | 4/1995 |
| EP | 0 917 381 A2 | * | 5/1999 |
| WO | WO 90/02382 A1 | * | 3/1990 |
| WO | WO 96/13007 | * | 5/1996 |
| WO | WO 98/06047 A1 | * | 2/1998 |

OTHER PUBLICATIONS

Rosen, Michele, "IBM Proposes Foundation for Electronic Commerce", MIDRANGE Systems, vol. 9, No. 8, p. 32, May 24, 199.*

(Continued)

*Primary Examiner*—John W. Hayes
(74) *Attorney, Agent, or Firm*—Galbreath Law Offices, P.C.; John A. Galbreath

(57) ABSTRACT

The invention is a business method for calculating royalty owner rights—specifically, calculating a metric of use corresponding to an aspect of royalty owner interest in an aggregate multi-royalty owned electronic content. In one embodiment, a large number of users, on the Internet, download or otherwise have access to a large collection of popular music. Even though some percentage of these users may never reconnect to the Internet in such a way as to facilitate sending an actual use report of listening from the collection, nevertheless a statistically significant number of the users will provide subsequent reporting, and this is sufficient to allow a metric of actual use to be computed for use in a royalty owner rights distribution event.

16 Claims, 3 Drawing Sheets

OTHER PUBLICATIONS

Figure 1:
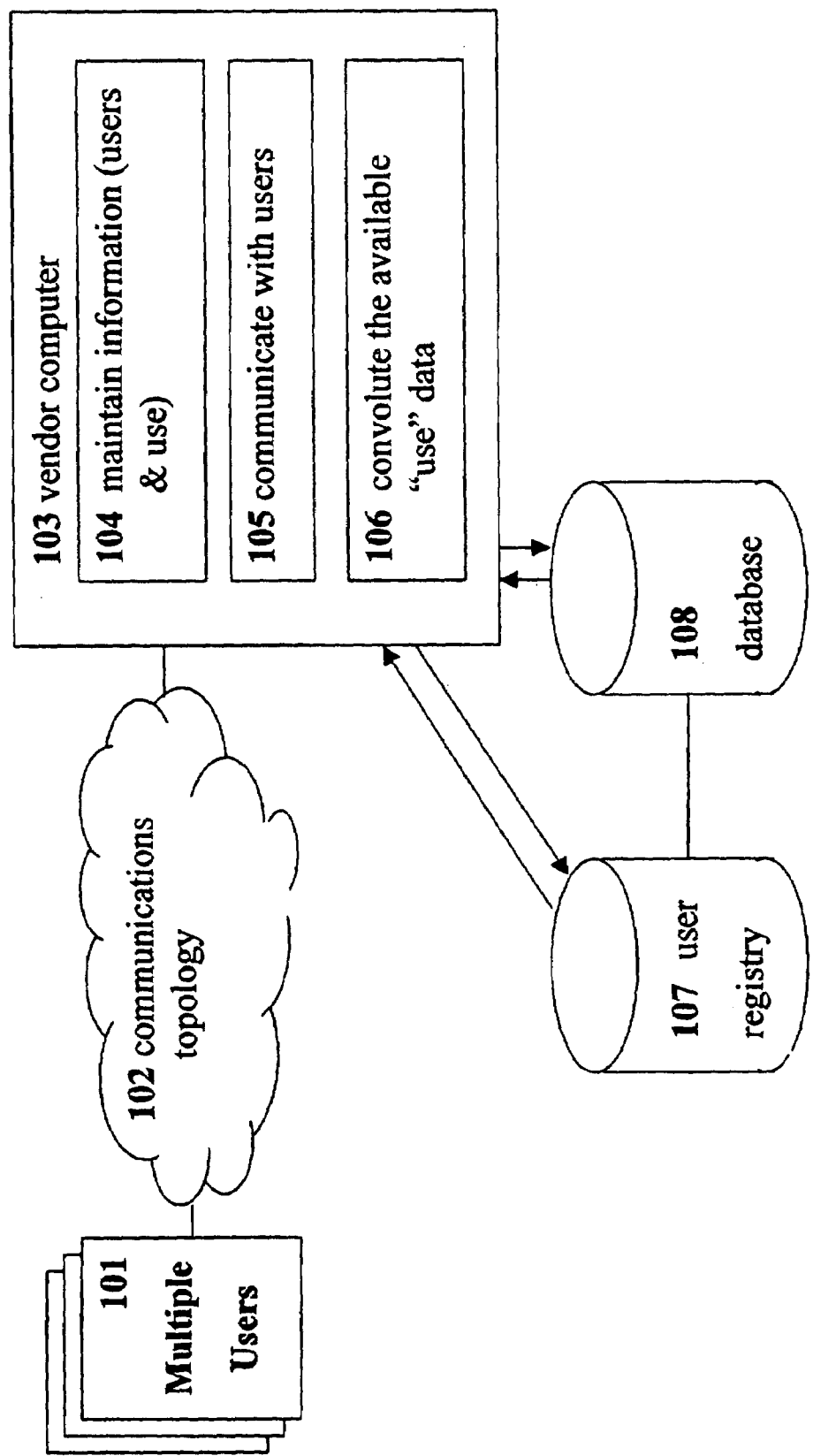

Thyfault, Mary E., "Data From Above", InformationWeek, No. 584, p. 107, Jun. 17, 1996.*

O'Connor, Mary Ann, "New Distribution Option for Electronic Publishers", CD-ROM Professional, vol. 7, No. 2, pp 134-135, Mar. 1994.*

Gennusa, Chris R., "BMI Is Here to Stay", Hollywood Reporter, vol. 356, No. 4, p. 41, Jan. 1999.*

Gennusa, Chris R., BMI Is Here to Stay: The Legendary Organization Remembers its Rock n Roll Roots While Expanding Into New Genres and Utilizing Technology to Fight the Copyright Wars, Hollywood Reporter, vol. 356, No. 4, Jan. 1999.*

Delicostopoulou, Andromachi, "Private Copying in Greece", Managing Intellectual Property, pp. 19-20, 1994.*

Gersh et al, "Structuring The Multimedia Deal: Legal Issues—Part 1, Licensing in the Multimedia Arena", CD-ROM Professional, vol. 6, No. 2, pp. 36-40, Mar. 1993.*

Breznick, Alan, "Not Exactly Prime Time: Small-biz TV Attracts An Audience—and competition, Despite Tacky Sets and Ungodly Airtimes", Business Week, No. 3654, Nov. 8, 1999.*

Anonymous, "Key Elements of Legislative Draft on Digital Royalties", Audio Week, vol. 3, No. 28, Jul. 15, 1991.*

* cited by examiner

Figure 3

301 storage medium having user-side software for Quantifying Royalty Owner Rights or vendor-side software for Quantifying Royalty Owner Rights

METHOD OF QUANTIFYING ROYALTY OWNER RIGHTS

FIELD OF THE INVENTION

The present invention generally relates to a business method for calculating royalty owner rights. More specifically, the present invention relates to calculating a metric of use corresponding to an aspect of royalty owner interest in an aggregate multi-royalty owned electronic content.

BACKGROUND OF THE INVENTION

There are presently two popular models for calculating royalty rights in Internet downloaded music or software. One model is a classical point of sales approach, calculating a royalty right for each download content. The other model is a classical point of use approach, calculating a royalty right for each use of a downloaded content. Given the current bandwidth capacity for downloading large volumes of contents, there is a need in the art for a method that will substantially preserve royalty owner rights while simultaneously allowing consumers access to large volumes of contents. More specifically, there is a need in the art to substantially preserve royalty owner rights in the context of large volumes of contents, which are comprised of many smaller contents deriving from a plurality of discretely separable royalty owners.

ADVANTAGES, OBJECTS AND BENEFITS OF THE INVENTION

Technical Issues: The present invention creates a statistical reporting metric for dividing royalty rights between a plurality of royalty owners. Since actual use for the entire user population is cumbersome to maintain, the present invention contributes a reporting mechanism which does not introduce a burdensome barrier to use, thus facilitating a more active consumer market for large content downloading.

Ergonomic Issues: The present invention is substantially transparent to the users, thus allowing a new dynamic market sector to emerge without introducing unnecessary customer complexities.

Economic Issues: The present invention allows a point of sales model to be used in conjunction with a statistical reporting mechanism—in order to simulate a business situation which is dynamically similar to a point of use model; albeit without introducing any cumbersome real-time reporting guarantees.

NOTICES

Numbers, alphabetic characters, and roman symbols are designated in the following sections for convenience of explanations only, and should by no means be regarded as imposing particular order on any method steps. Likewise, the present invention will forthwith be described with a certain degree of particularity, however those versed in the art will readily appreciate that various modifications and alterations may be carried out without departing from either the spirit or scope, as hereinafter claimed.

In describing the present invention, explanations are presented in light of currently accepted technological-business theories and models. Such theories and models are subject to changes, both adiabatic and radical. Often these changes occur because representations for fundamental component elements are innovated, because new transformations between these elements are conceived, or because new interpretations arise for these elements or for their transformations. Therefore, it is important to note that the present invention relates to specific technological actualization in embodiments. Accordingly, theory or model dependent explanations herein, related to these embodiments, are presented for the purpose of teaching, the current man of the art or the current team of the art, how these embodiments may be substantially realized in practice. Alternative or equivalent explanations for these embodiments may neither deny nor alter their realization.

SUMMARY OF THE INVENTION

The present invention generally relates to a business method for Quantifying Royalty Owner Rights, the method including a computerized system performing the substantially asynchronous transactional steps of:
One) maintaining a registry of a plurality of users;
Two) maintaining a database of materials provided by the system to users of the plurality of users;
Three) using a substantially packet-based protocol over a distributed data-communications topology, communicating with a user of the plurality of users,
  (1) from the user, accepting a report of the users prior use of materials provided by the system, and
  (2) from data in the report, convoluting an updated metric of use into respective materials records in the database; and
Fourth) from the database computing a quantification of royalty owner rights for at least one of the respective materials.

More specifically, the present invention relates to a business method for use in royalty owner rights calculating. For example, a large number of users, on the Internet, download a reporting program and a large bundled collection of popular music. Even though some percentage of these users may never re-connect to the internet in such a way as to facilitate sending an actual use report of listening from the downloaded collection, nevertheless a statistically significant number of the users will provide subsequent respective reporting; and this is sufficient to allow a metric of actual use to be computed for use in a subsequent royalty owner rights distribution business-event.

In the context of the present invention, "a substantially packet-based protocol over a distributed data-communications topology" relates to a discrete transaction event over an electronic communications media; such as the internet or a cellular telephone network, or the likes. Furthermore, in the context of the present invention, a user is a data-communications device that is at least sometime in data-communications with the computerized system that is performing the method steps of the present invention.

There are numerous embodiments of the present invention where the user device performs a download receiving of contents, a maintaining of use metrics for reporting back to the computerized system (that is performing the method steps of the present invention), and actualization of the downloaded contents; such as playing a music content or running a software content. These three user-side functions may be accomplished on a single integrated device such as a personal computer, or they may be accomplished using a plurality of dis-connect-able user-side devices. For example, a user side personal computer may download a large archive of music and then transfer a group of albums from the archive to a personal-listening device. It may or may not ever be know how many hours of listening was done on the personal-listening device, nor of which songs on the albums, nor of how much time of listening per song. Nevertheless, the transaction of transferring contents to a personal listening device and the elapsed interval until a next transferring of contents from the archive both can be used to convolute a simulate metric of use for reporting purposes.

Alternatively stated, the example relates to transferring the music or video files to a personal player. The customer downloads the library of music to his computer and then he transfers songs to his personal player for listening. This adds an extra step to the reporting process: Vendor to Individual, Individual then passes the data among his own compatible devices. All the personal devices support the same tracking mechanisms and report back on usage when he does updates. For example, the he transfers movies from the library to the car, the family goes on a trip and the kids watch the movies on the portable or built in players in the car, then next time he updates the movies in the car or portable player, the player reports on the use to his computer, the computer then on the next update reports back to the Vendors computer.—This gives the user true unlimited use and freedom while maintaining the Royalty owner rights.

BRIEF DESCRIPTION OF THE FIGURES AND APPENDICES

Figure 2:
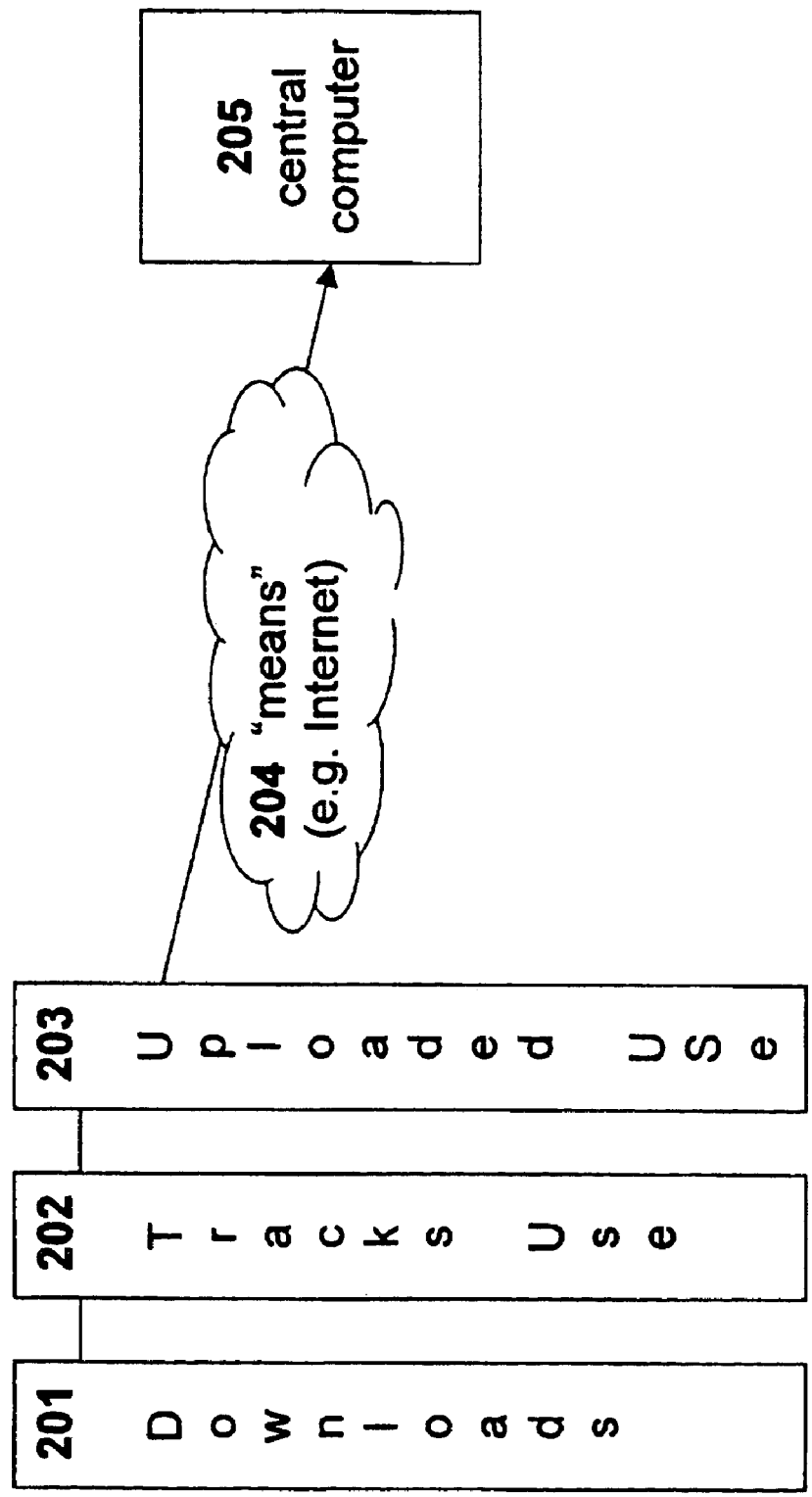

In order to understand the invention and to see how it may be carried out in practice, embodiments including the preferred embodiment will now be described, by way of non-limiting example only, with reference to the accompanying drawings, in which:

FIG. 1 illustrates a schematic view of a computerized system (incorporating software for implementing the method of the present invention) interconnected to a data-communications topology having further connected thereto an occasional plurality of users;

FIG. 2 illustrates a schematic view of a software managed process corresponding to the preferred use of the present invention; and FIG. 3 illustrates a schematic view of a storage medium having recorded therein a machine-readable program of instructions for accomplishing the method of the present invention—and these instruction may relate either to a user-side computer system or to a vendor-side computer system.

DETAILED DESCRIPTION OF THE INVENTION

The present invention generally relates to a business method for Quantifying Royalty Owner Rights, the method including a computerized system performing the substantially asynchronous transactional steps of:

One) maintaining a registry of a plurality of users;

Two) maintaining a database of materials provided by the system to users of the plurality of users;

Three) using a substantially packet-based protocol over a distributed data-communications topology, communicating with a user of the plurality of users, a) from the user, accepting a report of the users prior use of materials provided by the system, and b) from data in the report, convoluting an updated metric of use into respective materials records in the database; and Four) from the database computing a quantification of royalty owner rights for at least one of the respective materials.

More specifically, the present invention relates to a business method embodied system for tracking and computing royalties which must be paid to the owners of the royalties, usually for items which are downloaded. For example, the business method of the present invention may be embodied as a system that is divided into two parts, one of which resides on a computer which is downloading materials, the user computer, and the other which resides on a computer from which materials are being downloaded, the host or vendor computer. The portion of the system which resides on the user computer includes software which enables the downloading of materials from the vendor computer, software which records in a ledger the use of the downloaded material on the user computer, and software which enables the user computer to report the information in the ledger to the vendor computer. The vendor computer portion includes a registry of the various users, optionally descriptive profiles of these users, and a database which includes a list of materials which are downloaded by the vendor computer, indications of which materials were provided to which user, and the ability to manipulate the figures provided by reports from the user computers and to calculate royalty payments according to these numbers in conjunction with contractual parameters.

Additionally, the portion of the system residing on the vendor computer includes software that allows the provision of materials to the users and the receipt of reports from the user computer. Materials may be sent from the vendor to the user by any means through which a computer-usable file may be transferred, such as physical delivery (via a mail service or a package delivery service) of a CD, DVD, floppy disks, etc., download (over the Internet, a local area network (LAN), or a direct-dial connection. A direct means of communications (e.g. the Internet or a LAN) must occasionally exist between a preponderance of users' computers and the vendor computer so that the user computers can report to the vendor computer the use of downloaded files as was tracked.

The system is useful in a situation where a vendor wishes to enable a customer to purchase multiple items as a package, but where the vendor must pay royalties only according to substantially an actual use of items, or more particularly where the various items in the package are owned by different owners and the vendor must calculate royalties for those various owners. One example would be when someone purchases a collection of games over the Internet in "download" form (i.e. the purchaser receives data over the Internet, but not any physical media from the vendor). The vendor may have combined into one-package games that were created by several different individuals. The vendor, in this case, is conceptually obligated to pay the creators of the games royalties only according to substantially the actual use of the games, and not according to the purchase of the games.

More specifically, a metric representing substantially actual use is calculated for each respective constituent game in the package, and these respective metrics are used for proportional division of the collective royalty collected for the respective download of the game packages to a plurality of users. The vendor includes with the games a program that tallies the number of time that the customer plays each game. The information is retained in the customer's computer. On the customer's next visit to the Internet site at which he purchased the games, the program reports to the vendor's computer the specific number of times each game was used and the vendor is able to allocate to the respective the creators of the games royalties accordingly. Equivalently, for the purposes of the present invention, the program may report a normalized view of use; so that for an unknown number of hours of aggregate usage, the percentage of that aggregate taken by playing each game is reported.

Alternatively, a vendor selling collections of songs may agree to include certain songs in a particular collection, only if the owner agrees that royalties will only be paid if the customer actually listens to the song, the remainder of the proportionately allocated royalty payment going to the vendor or to the royalty owner of a most popular song in the same downloaded collection. Another type of example contract may specify that the relative amount of the royalties to be paid, as a percentage with respect to the aggregate royalty collected for downloading the package, rises in discrete rounded-off steps that are based on the number of times that customers actually play the song.

More specifically, the present invention relates to a tracking and reporting mechanism that enables the vendor to get a representative sampling of the number of times that a particular song is played, based on the number of times that individual customers play the song on the computer on which the tracking program exists. Likewise, when the material being downloaded is software, the vendor is able to track the use of the software.

Using such a tracking system, a vendor is able to package together a variety of items for sale rather than selling them piece by piece. Without interfering with royalty payment and calculations, the consumer is able to download a package of items with a single command instead of manually downloading each of the items he wishes to own, one at a time. Thus, an Internet site which enables customers to download music may contract with an unknown artist to promote her music by packaging it with popular music. The contract stipulates that the artist will receive royalties at a stipulated rate according to the number of customers who actually listen to the songs by that artist, and only after the sales of the music package exceed 1000. As customers visit the site, they are offered the option of downloading songs individually for $1.99 per song, or a collection of 50 songs, including 5 songs by the unknown artist, for a package price of $24.99. Upon requesting a purchase, customers are asked to input information. Certain items of information are mandatory (such as name and credit card or electronic payment account information for use in billing). Other items are optional (such as age, profession, preferred music, and city of residence). The information is recorded in a database. Using the mandatory information, the vendor is able to create a registry of all customers. The vendor is further able to use the optional information to create a profile for each customer who submits the information.

In the event that the customer elects to download a package of music, the vendor includes with the music files a software application for tracking the actual use of the music files. The software may be a plug-in, self-installing, or may require manual installation. After it is installed on the customer's computer, which includes software for listening to the downloaded music, each time a song from the purchased collection is played on the computer, the tracking software will note which song was played and for what duration. The information is retained in a data file. When the customer next returns to the Internet site from which the music was downloaded, the vendor's software identifies the customer's computer as a "returning" customer (using currently available technology) and requests the data file from the customer's computer. The data is then received into the vendor's database. A similar process is performed with multiple customers as each purchases a collection of songs that includes songs by the unknown artist. Of 50 customers who purchased such a collection, some percentage (perhaps half) return to the vendor's Internet site, thus enabling the vendor to collect the data files from their computers, and to calculate a proportionality metric for the unknown artist.

The vendor may decide whether he wishes to collect complete information about use of the files from each returning customer each time the customer returns or whether he wishes to gather partial information about the use of the files each time the customer returns and piece the information together or use specialized software to analyze the information and project a complete picture. The vendor may elect to gather complete information each time in order to guard against potential loss of information either from the customer's computer or from the vendor's computer. Alternatively, the vendor may be satisfied with sampling the use of downloaded during the month prior to the customer's return to the Internet site. In this case, software on the vendor's computer uses the data from the single month to derive information about the use of the files during other months, much in the same way that the total use of a single file is derived from data regarding use by a portion of the customers. A third option that exists is for the vendor to collect information since the previous collection of information. If this option is used, each time that a customer return's to the vendor's site, the vendor's computer collects information about use of the downloaded files since the customer's previous connection with the vendor's site.

In all three methods of collection, the information is saved in a database on the vendor's computer. When the vendor reaches the point in time when he must calculate royalties for the purpose of payment, he operates the software that extrapolates information from the database according to predefined parameters and calculates the royalties, which are to be paid. In this case, the software would search through the data obtained from the 25 files and extrapolate information regarding the number of times each of the songs of the unknown artist were played for 15 seconds or more. (The minimum duration lessens the possibility that a customer accidentally played the song, and upon realizing that the wrong song was playing, terminated the song.) The software calculates the average number of times that each customer listened to each of the songs according to the data from the available file. The software then aggregates these averages according to accepted statistical computation procedures and allocates a metric of royalty payment proportionality for each song in the collection of 25 songs. In contradistinction, were the user to have downloaded a song individually and not as part of a collection, then the entire royalty payment for that download would be forthcoming to the royalty owner.

FIG. 1 illustrates such a system. Multiple users (101) are connected to a software system on a vendor's vendor computer (103) via a communications topology (102). The software on the vendor's computer includes processes which are able to maintain information regarding users, materials purchased, and reported use (104), communicate with users to allow them to download materials and to report back the use of those materials (105), and convolute the available data regarding use into a usable metric based on which the processes compute royalty payments (106). The software system enters information into and draws information from a registry of users (107) and a database of numbers (108).

In some cases, the registry of users includes information about the users beyond what is needed to allow them to purchase and download materials. Such information is obtained at the time a sale is made and is called a user profile. A user profile may include information such as the gender, age of the customer, the customer's background, ethnic group, income, family status, and geographic location. If enough user profiles are obtained, statistical data may be obtained from them and used by the vendor. For example, the vendor may note that in a particular collection, only females between the ages of 30 and 35 listened to a particular song. Using such information enables the vendor to build collections to target a particular market, and to set specific terms for royalties on songs which will be included in the collection. Thus, when an unknown musician wishes to publicize his music, he may agree to waive 90% of the normal royalty payment for a particular song in exchange for having the song included in a music collection which targets 20–25 year olds living on the West Coast in the United States. The royalty information for this song would be included in the data which the system uses in calculating the royalty payments to the musician.

The first embodiment of the present invention relates to the business method wherein maintaining a database of materials provided includes providing the materials to the respective users, and the providing is by downloading via a distributed data-communications topology. Two common examples of such a topology would be a local area network and the Internet. Hence, a computer user, may download from the Internet a package of educational software, which includes a reading program, a math program, a spelling program, an interactive encyclopedia, and an art and drawing program. Along with the material, the user downloads the portion of the business system which tracks use of the files on the user's computer. The user is informed that he may return to the Internet site from which he downloaded the package any time within the first twelve months after downloading the package in order to receive upgrades and support. Other users download the same software package over the Internet within the same month. In the vendor's computer, meanwhile, identifying information about each user and the user's computer is noted in the registry of users, along with information about the software package that was purchased. The vendor's contract with the creator of each of the programs stipulates that royalties will be paid on the programs according to actual use tallied by the system's tracking program that resides on the users' computers. The contract also stipulates that royalties are not paid on the sale of a program if it is used fewer than three times or for fewer than 60 minutes total in the year following the purchase of the package of programs, as such use is considered "trial use."

Of the total of users who downloaded the package during a particular time frame, some of the users regularly use the reading, math, and spelling programs, as well as the encyclopedia on the computers which were used to purchase the software. Of the others, some regularly use only the reading and the math, some regularly use only the reading and the spelling, and some use only the encyclopedia on the computers used for purchasing the software. All of the users who do not use the encyclopedia tried using once or twice before discarding it in favor of an alternative. Half of the users tried the art program once before deciding against using it, and the other half never tried it at all.

Users return to the Internet site in order to check for upgrades on the programs. Each time a user returns, the vendor's computer requests data about the use of the files on the user's computer during the past 30 days, and the user's computer uploads a data file to the vendor's computer. By the end of a year, 80% of the users who purchased the software package have returned, and of those, 25% have returned twice or more. The vendor's software then analyzes the data to discard any overlapping information (such as data from a user who returned to the site twice in the same day, thus having twice uploaded to the vendor's computer data from the same 30 days). Given the provisions of the contract, the software also discards all use of the art program, and the use of the encyclopedia by those who only tried using it once or twice. Additionally, the software discards all other data from "trial use" of individual programs. From the remaining data, the software calculates the average number of times each software program was used throughout the year and multiplies that average by the total number of packages that were sold, thus calculating the total use of the software program over the course of a year. Proportional metrics for royalties are then calculated accordingly.

According to the first variation of the embodiment wherein maintaining a database of materials provided includes providing the materials to the respective users, the provided materials include a user-computer executable program for facilitating the user maintaining a report for subsequent reporting to the computer system. In some cases all that the user downloads is the software system which resides on the user computer and tracks the use of other downloaded items, maintains the use data in a data file, and enables the user computer to report use of other downloaded items to a vendor computer. Hence, in some cases, all that is downloaded initially is a portion of the business system, and not other materials, the use of which will be tracked by the system.

According to the second variation of the embodiment wherein maintaining a database of materials provided includes providing the materials to the respective users, the provided materials include data for reproduction as audio contents. In this case, the materials which the user downloads, which will be tracked by the business system include audio files such as music, spoken voice recordings, or a collection of pre-recorded messages for an phone answering device which is built into the user computer's modem. Someone may, for example, purchase over the Internet an educational package for the study of art history. The package includes images of 50 works of art, and audio files with lectures corresponding to each of the works. Each of the lectures was researched and recorded by a separate individual, and the vendor is contractually obligated to pay each individual who created a recording a specified fee upon sale of the lecture series, and an additional amount for each time the lecture created by that individual is played. When the educational package is downloaded, the tracking and reporting software is downloaded with it. The installation of the software includes installation of the tracking and reporting program. Each time the user listens to a lecture on the computer with the tracking software, the tracking software is automatically activated. The tracking software notes which lecture was played and compiles a data file with this information. When the same user returns to the vendor's Internet site in search of another program, the vendor's computer recognizes the user's computer as a former customer and requests from it the data file compiled by the tracking program. The data file is uploaded to the vendor computer, and the data from data file is added to a database which is kept on the vendor's computer. The same process is repeated with all of the customers who purchase the particular program. After six months, the software on the vendor's computer analyzes the data regarding the use of the lectures. Based on the available data, a number representing the average use of each lecture is obtained and the total use of each lecture by all of the customers is extrapolated from this number, based on the total sales of the program. The vendor is then able to pay royalties according to his contractual obligation.

According to the third variation of the embodiment wherein maintaining a database of materials provided includes providing the materials to the respective users, the provided materials include data for reproduction as visual contents. In this case, the materials which the user downloads, which will be tracked by the business system include graphics files such as pictures, photographs, clip-art, or video files. For example, a vendor may sell a package of 5000 clip-art pictures in various categories. With each package sold, the vendor includes software for tracking and recording use of the various pictures. When the customer downloads the pictures, the software is installed on the customer's computer. The package is sold to multiple customers. Each time a customer opens the clip-art package to select a picture, the tracking software is operated. The tracking software notes which picture was selected each time, and the information is stored in a data file. Each time one of the users returns to the site from which the pictures were downloaded, the vendor's computer, upon recognizing the user's computer, requests the data file and the user's computer uploads the data file to the vendor's computer. The data from the file is input into a database on the vendor's computer. After six months, the software on the vendor's computer analyzes the data regarding the use of the lectures. Based on the available data, a number representing the average use of each picture is obtained and the total use by all users is extrapolated from this number, based on the total sales of the program. The vendor is then able to pay royalties to the creators of the pictures according to the use of the pictures.

According to the third variation of the embodiment wherein maintaining a database of materials provided includes providing the materials to the respective users, the provided materials include data for execution as computer software. Thus, when an Internet site sells package of games, it may, for the purpose of calculating royalties, use this business system in order to track the actual use of the games by the buyers. The first time that a customer downloads a package of games, he downloads also software for tracking and reporting the use of these games. Each time one of the downloaded games is played on the user computer, the tracking software is activated. Over a period of time, a data file is compiled with information regarding the use of the games. The next time that the customer returns to the site from which he downloaded the games, the file is requested by the vendor's computer and uploaded to it. Using this data and data from other users, the vendor is able to calculate use of each game for the purpose of royalty payments.

A further embodiment of the present invention relates to the business system wherein the communicating with the user includes accepting a request for downloading a plurality of substantially new materials. In this case, the communication between the user computer and the host or vendor computer includes a request by the user computer to download multiple files (as opposed to a single file) which are substantially new (as opposed to updates to existing files) and the acceptance of that request by the host or vendor computer. As such, a user computer may dial a host computer with a request to download a collection of files from the host computer. Aside from the files intended for downloading, on the host computer exist a registry of permitted user (i.e. who is permitted to download files), a database with information regarding the downloading of files and the use of the downloaded files, and software for analyzing the information in the database and calculating royalty payments accordingly. Only computers which have on them software for tracking and reporting use of software are allowed to download files. When the user computer connects to the host computer, the host computer verifies the user computer's permission to download files, and upon verification, accepts the request for the downloading of files. Before the files are actually transmitted, however, the host computer requests and receives data regarding use of downloaded files since the last time the user computer connected with the host computer. Such data can then be used by the host computer in calculating royalties owed for use of the files.

An additional embodiment of the present invention relates to the business system wherein accepting a report of the users prior use includes an accounting of use since a most recent prior accepting from the user of a report of the users prior use. This refers to the case where the data file which is uploaded from the user computer to the host or vendor computer includes only differential information regarding use of downloaded files (i.e. information regarding use of files which was collected by the user computer and which has not yet been recorded by the host computer), as opposed to all of the information collected by the user computer from the time the files were downloaded until the time the use report is requested by and uploaded to the host or vendor computer. Thus, if on January 1 a user computer with tracking and reporting software installed on it may dial into a host computer and download files. The user computer next connects to the same host computer on February 1 and the host computer requests data regarding file use from the user computer. When the user computer next connects on March 1, the host computer requests use data only for use after February 1. On April 13, when the user computer connects again, the host computer requests use information only for use after March 1, and so on. Each time the user computer connects to the host computer, the host computer gathers information for use since the previous connection. The host computer is thus able to avoid redundancies in the information which is gathered into its file use database, and when total use is calculated and royalties are computed, the software analyzing the information in the database does not need to discard overlapping information.

A further embodiment of the present invention relates to the business system wherein accepting a report of the users prior use includes an accounting of cumulative use, substantially since becoming a user. In this case, when the user computer reports to the host or vendor computer, all file use data is reported, beginning with the initial installation of the system on the user computer. This allows for the recovery of data lost from the host or vendor computer after a system failure (e.g. the loss of a hard drive or software failure). Hence, on January 1, a user computer with tracking and reporting software installed on it downloads files from a host computer with the business system operating on it. On February 15, the user computer reconnects to the same host computer. The host computer requests data regarding file use for the files from January 1 until February 15. On March 31 the user computer connects again, and the host computer requests file use information from January 1 until March 31. When software on the host computer eventually calculates total use and royalties to be paid, the overlapping data will be discarded.

A further embodiment of the present invention relates to the business system wherein accepting a report of the users prior use includes an accounting of the users recent use during a predetermined proximate prior time interval. As a third option for reporting file use, the host or vendor computer may request information regarding use during a predetermined period of time. For example, a host or vendor computer may request information regarding use during the 30 days prior to the connection between the user computer and the host computer. Alternatively, a host or vendor computer may request information regarding file use between to specified dates (e.g. April 1 to June 30). In such a case, the information which the host computer collects may be partial and software will be used to analyze the data in order to project use of each file at other points in time. The host computer may request information regarding different dates for different users, according to predetermined parameters. For example, a music vendor collecting data regarding how often music files are played may determine that for high school students, an average of the use in August and September represents a typical month, since the average of the use in those months is identical to the average use throughout the entire year. On the other hand, for those between 30 and 35, April and May represent typical months. The music vendor, wishing to collect information regarding file use which will enable him to pay royalties, would then configure the computer to which the users connect to gather information about file use for different dates according to the age group of the customer: for those under 18, the vendor computer requests information about use of the files between August 1 and September 30, and for those between 30 and 35, the vendor computer requests information regarding use of the files between April 1 and May 31.

Another embodiment of the present invention relates to the business system wherein maintaining a registry includes a respective profile for each user of a preponderance of the users in the registry. In this case, the vendor maintains not only a list of users, but identifying information about each user.

In many cases, a vendor asks a customer for personal information in order to complete a sale of a product. Generally, certain items of identifying information (e.g. name, shipping and billing addresses, including zip codes, and credit card or electronic payment account information) are mandatory to complete the purchase. Though other items (e.g. age or age range, occupation, household income range, ethnic group, and education) are optional, consumers often elect to provide the information. The information provided by customers is maintained by the vendor in a database. Assuming that the majority of users provide such information, the vendor is them able to analyze the customer information by various categories and to provide products suitable to a particular group of users. With regard to royalties, a statistical analysis may include an analysis of file use by category such as age group or geographical location. Thus, upon receiving use reports from a portion of customers, the vendor is more accurately able to analyze and project the number of times similar or identical files were used by other customers.

According to the first variation of the embodiment wherein maintaining a registry includes a respective profile for each user of a preponderance of the users in the registry, convoluting includes correlating the updated metric with the respective user profile. In this case, rather than determining the average use of a file for a particular file, use is determined by category, where the categories are determined by the user profiles. Hence, a vendor selling music over the Internet may gather user profiles for a majority of customers. The vendor sells a package of 20 songs, including a variety of music. 80% of the users who purchased the package over a period of several months return to the record company's web site, and use files from their computers are uploaded to the vendor's computer. Upon analysis, the vendor determines that during a particular period of time for which data is available, 20–25 year-olds listened to 12 of the 20 songs an average of 5 times per week, and they did not listen to the other songs at all. 25 to 30 year olds, on the other hand, listened to four of the songs an average of 3 times per week, three of the songs an average of twice a week, and three of the songs an average of once a week. They did not listen to the other songs. Statistics for other age groups are compiled similarly. Based on these statistics and a determination of the age groups and number of customers within each age group, the vendor calculates the total number of times each song was played in order to determine what royalties must be paid.

A further embodiment of the present invention relates to the business system wherein computing includes a predetermined contractual-based apportioning of royalty owner rights for reported use of respective materials by the user. In other words, the statistical information made available by the collection of data regarding use and the analysis of that data is used to determine the amount owed to the owner of royalty rights for the use of his product, in accordance with an existing contract. For example, a software distributor may contract with the writer of a program which allows the user to display a menu of multiple graphics files in graphic form, as "thumbnails." The contract stipulates that the "quick view" program will be included with a graphic arts program, but the writer of the program will be paid royalties only according to use. When the graphic arts program is sold, the "quick view" program is included with it. The "quick view" program installs automatically with the graphic arts program. After operating for some time on a system which has on it software for tracking the use of the software, the user computer connects to the distributor's Internet site, and the use of the software is reported to the distributor's computer. The distributor then uses the data provided by the user, computer to determine what the use of the software will be over a year. Based on this, the distributor is able to pay royalties to the creator of the "quick view" software.

A further embodiment of the present invention relates to the business system wherein computing includes a predetermined contractual-based apportioning of royalty owner rights for reported use of respective materials by the plurality of users. In this case, a collection of multimedia files which are full length movies are available through a software library. The library users pay a monthly fee and may use as many of the files as they wish. The files may be downloaded from an Internet site, and monthly payments are made monthly through the same Internet site. Each new member of the library is given software for tracking the use of the software on his computer. When each member connects to the library's Internet site in order to pay his monthly dues, the tracking software reports to the library's computer the use of the files. According to this information, the library is able to pay royalties according to an existing contract with the owners of the royalty rights. The information gathered is analyzed by the library and through statistical means, to calculate the total use of the files by all those who were library users during the previous month. According to this information, the library is able to pay royalties to the owners of the rights for the files.

According to the first variation of the embodiment wherein computing includes a predetermined contractual-based apportioning of royalty owner rights for reported use of respective materials by the plurality of users, apportioning is extrapolated to represent use by the entire plurality of users. In this case, use data collected from a portion of users is analyzed to extrapolate information which reflects the file use by all users. In the case of a multimedia library, the possibility exists that not all users will continue their membership from one month to the next. In this case, the available use data covers only a portion of the members. The available information is analyzed by the library and through statistical means, to calculate the total use of the files by all those who were library users during the previous month. According to this information, the library is able to pay royalties to the owners of the rights for the files.

A further embodiment of the present invention relates to an article of manufacture including a computer usable medium having computer readable program code embodied therein for Quantifying Royalty Owner Rights, the computer readable program code in said article of manufacture including:

- One) computer readable program code for causing a user computer to accept a download of materials from a remote computerized system;
- Two) computer readable program code for causing the user computer to maintain a ledger of use of the downloaded materials; and
- Three) computer readable program code for causing the user computer to upload, to the remote computer system, a report including sums maintained in the ledger.

This embodiment refers to the portion of the business system which resides on the user computer. This portion of the system is a software program which allows the user computer to perform several operations. First, using this software, the user computer may receive or download files which are to be used and the use of which is to be tracked on the user computer. Downloading here refers to any method by which files are delivered to the user computer, including on a floppy disk, a CD, a DVD, as a file attached to electronic mail, as a download from another computer via the Internet, a LAN, direct dial, or wireless transmission. Next, using this software, all use of downloaded materials may be tracked and data regarding the use of the files may be stored in a data file. Finally, the information regarding use of the downloaded files which was stored on the user computer may be reported to a central computer which maintains a database which includes information about use of the downloaded materials by multiple users. This software allows the user computer to upload the data file to the central computer.

Hence, using this software, the user computer may connect to an Internet site and download a collection of screen saver files. Each time one of the files is used as a screen saver, the software notes the use in a data file. When the user computer next connects to the Internet site, the user computer uploads to the central computer (via the Internet site) the data file with the information regarding the use of the downloaded files.

FIG. 2 illustrates the use of this software on the user computer. The software downloads (201) materials. The software then tracks (202) the use of the downloaded files, and when the user computer then connects to the central computer (205) via a means (204) such as the Internet, information regarding use of the downloaded files is uploaded (203) to the central computer (205) which has a database with information regarding user computers, user, materials downloaded, and use of downloaded materials.

According to the first variation of the embodiment which relates to an article of manufacture including a computer usable medium having computer readable program code embodied therein for Quantifying Royalty Owner Rights, and the computer readable program code in the article of manufacture includes computer readable program code for causing a user computer to accept a download of materials from a remote computerized system, the downloaded materials include computer software. Thus, the materials downloaded to the user computer are computer programs. For example, a company needing a particular software tool for internal use may offer an incentive to its employees: employees may create such a tool during the coming month. At the end of the month, all of the submitted software will be available for download from a special server to which all office computers may connect by dialing in with a modem, and all employees will be requested to download at least one of the programs for trial. At the end of another month, the usability and efficiency of each of the programs is to be judged according to it use on employee computers and the employee with the most popular software program will win a cash bonus. In the event that two or more programs are equally popular, the creators will split the bonus.

Following the submission of the programs, the systems manager in the company installs software on every employee's computer which will enable that computer to perform three functions: to connect to the central computer and download the trial software from it, to track the use of the trial software, and, on a specified date, to automatically dial back into the central computer to report the respective use of the various software programs. At the close of the month, the central computer receives reports from all computers which were operated on the date specified for reporting the use of the software. Using the information collected, the company is able to decide which software program will be used company-wide, and which employee will receive the bonus.

According to the second variation of the embodiment which relates to an article of manufacture including a computer usable medium having computer readable program code embodied therein for Quantifying Royalty Owner Rights, and the computer readable program code in the article of manufacture includes computer readable program code for causing a user computer to accept a download of materials from a remote computerized system, the downloaded materials include data that can be converted into audio contents. Thus, this software, after being installed on a system, may enable the user to download audio files, the use of which will then be tracked and reported back to a central database for the purpose of calculation of royalties. An audio library which is contractually obligated to pay royalties according to the use of its holdings, may provide its members with a software package upon registration and payment of a monthly membership fee. The software package enables the user to dial into the library's computer, to select materials and to download them. Additionally, the software tracks the use of the materials and reports them to the library's computer whenever a connection is made. Using the data obtained gathered and reported by the software, the library is able to pay royalties according to its contractual obligations.

According to the second variation of the embodiment which relates to an article of manufacture including a computer usable medium having computer readable program code embodied therein for Quantifying Royalty Owner Rights, and the computer readable program code in the article of manufacture includes computer readable program code for causing a user computer to accept a download of materials from a remote computerized system, the downloaded materials include data that can be converted into visual contents.

In the same manner that an audio library may provide software to members which enables them to download audio material, track the use of the downloaded audio materials, and report back to a central computer the use of the materials, a video library, offering movies to be played on a computer may provide similar software to its members. The software enables users to download videos when the member's computer connects via a direct dial connection to the library's computer, tracks the number of times that each video is played on the member's computer, and reports the use to the library's computer upon the next connection. Using the information gathered, the library's computer is able to calculate royalties owed.

Another embodiment of the present invention relates to a program storage device readable by machine, tangibly embodying a program of instructions executable by the machine to perform method steps for Quantifying Royalty Owner Rights, said method including a computerized system performing the substantially asynchronous transactional steps of: maintaining a registry of a plurality of users;

One) maintaining a database of materials provided by the system to users of the plurality of users;

Two) using a substantial packet-based protocol over a distributed data-communications topology, communicating with a user of the plurality of users, (1) from the user, accepting a report of the users prior use of materials provided by the system, and (2) from data in the report, convoluting an updated metric of use into respective materials records in the database; and Three) from the database computing a quantification of royalty owner rights for at least one of the respective materials.

This embodiment refers to any memory storage device, such as a CD or floppy disks, which contains the software program code for the business system. As such, the program which allows the user to download software, to track the use of the downloaded software, and to report such use to a centralized database, which contains information about the use of the same or similar software, may be stored on a memory medium, such as a CD. Likewise, the host or vendor portion of the business system, which allows a vendor to maintain a registry of users and a database of information regarding material, communicates with the users, accepts information regarding the use of downloaded software and from this information extrapolates information which allows the computation of royalties, and which computes royalties owed, may also be stored on a memory medium such as a CD.

In FIG. 3 a storage medium (301) is illustrated. The storage medium has recorded therein a machine-readable program of instructions for accomplishing the method of the present invention—and these instructions may relate either to a user-side computer system or to a vendor-side computer system.

The user-side system storage medium relates to an article of manufacture including a computer usable medium having computer readable program code embodied therein for Quantifying Royalty Owner Rights, the computer readable program code in said article of manufacture including:

One) computer readable program code for causing a user computer to accept a download of materials from a remote computerized system;

Two) computer readable program code for causing the user computer to maintain a ledger of use of the downloaded materials; and Three) computer readable program code for causing the user computer to upload, to the remote computer system, a report including sums maintained in the ledger.

The vendor-side system storage medium relates to a program storage device readable by machine, tangibly embodying a program of instructions executable by the machine to perform method steps for Quantifying Royalty Owner Rights, said method including a computerized system performing the substantially asynchronous transactional steps of the present invention, substantially as described and illustrated above.

What is claimed is:

1. A business method for quantifying royalty owner rights, the method including a computerized system performing the substantially asynchronous transactional steps of:

one) maintaining a registry of a plurality of users;

two) maintaining a database of materials provided by the system to users of the plurality of users, the users paying subscription fees to the database maintainer unrelated to the usage of a specific material, for access to the database;

three) using a substantially packet-based protocol over a distributed data-communications topology, communicating with a user of the plurality of users, a) from the user, accepting a report of the user's prior use of materials provided by the system, the report being a sample of the prior use by the plurality of users, and b) from data in the report, statistically convoluting an updated metric of use into respective materials records in the database; and four) from the database computing a quantification of royalty owner rights for at least one of the respective materials, said quantification serving to divide the collective subscription fees of the plurality of users based on the updated metric.

2. The method according to claim 1 wherein maintaining a database of materials provided includes providing the materials to the respective users, and the providing is by downloading via a distributed data-communications topology.

3. The method according to claim 2 wherein the provided materials include a user-computer executable program for facilitating the user maintaining a report for subsequent reporting to the computer system.

4. The method according to claim 2 wherein the provided materials include data for reproduction as audio contents.

5. The method according to claim 2 wherein the provided materials include data for reproduction as visual contents.

6. The method according to claim 2 wherein the provided materials include data for execution as computer software.

7. The method according to claim 1 wherein the communicating with the user includes accepting a request for downloading a plurality of substantially new materials.

8. The method according to claim 1 wherein accepting a report of the user's prior use includes an accounting of use since a most recent prior accepting from the user of a report of the user's prior use.

9. The method according to claim 1 wherein accepting a report of the user's prior use includes an accounting of cumulative use, substantially since becoming a user.

10. The method according to claim 1 wherein accepting a report of the user's prior use includes an accounting of the user's recent use during a predetermined proximate prior time interval.

11. The method according to claim 1 wherein maintaining a registry includes a respective profile for each user of a preponderance of the users in the registry.

12. The method according to claim 11 wherein convoluting includes correlating the updated metric with the respective user profile.

13. The method according to claim 1 wherein computing includes a predetermined contractual-based apportioning of royalty owner rights for reported use of respective materials by the user.

14. The method according to claim 1 wherein computing includes a predetermined contractual-based apportioning of royalty owner rights for reported use of respective materials by the plurality of users.

15. The method according to claim 14 wherein apportioning is extrapolated to represent use by the entire plurality of users.

16. A program storage device readable by machine, tangibly embodying a program of instructions executable by the machine to perform method steps for quantifying royalty owner rights, said method including a computerized system performing the substantially asynchronous transactional steps of:

one) maintaining a registry of a plurality of users;

two) maintaining a database of materials provided by the system to users of the plurality of users, the users paying subscription fees to the database maintainer unrelated to the usage of a specific material, for access to the database;

three) using a substantial packet-based protocol over a distributed data-communications topology, communicating with a user of the plurality of users, a) from the user, accepting a report of the user's prior use of materials provided by the system, the report being a sample of the prior use by the plurality of users, and b) from data in the report, statistically convoluting an updated metric of use into respective materials records in the database; and four) from the database computing a quantification of royalty owner rights for at least one of the respective materials, said quantification serving to divide the collective subscription fees of the plurality of users based on the updated metric.

* * * * *